United States Patent
Juh et al.

(10) Patent No.: US 10,533,567 B2
(45) Date of Patent: Jan. 14, 2020

(54) DEFLECTION SPRING SEAL

(71) Applicant: United Technologies Corporation, Farmington, CT (US)

(72) Inventors: Christopher M. Juh, South Windsor, CT (US); Ross Wilson, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 309 days.

(21) Appl. No.: 15/608,415

(22) Filed: May 30, 2017

(65) Prior Publication Data

US 2018/0347576 A1  Dec. 6, 2018

(51) Int. Cl.
| | |
|---|---|
| F01D 11/00 | (2006.01) |
| F04D 29/044 | (2006.01) |
| F01D 5/02 | (2006.01) |
| F01D 25/18 | (2006.01) |
| F04D 29/04 | (2006.01) |
| F04D 29/047 | (2006.01) |
| F04D 29/10 | (2006.01) |
| F16C 33/72 | (2006.01) |
| F16J 15/54 | (2006.01) |

(52) U.S. Cl.
CPC ............ *F04D 29/044* (2013.01); *F01D 5/026* (2013.01); *F01D 11/003* (2013.01); *F01D 25/183* (2013.01); *F01D 25/186* (2013.01); *F04D 29/0405* (2013.01); *F04D 29/0473* (2013.01); *F04D 29/10* (2013.01); *F05D 2240/55* (2013.01); *F05D 2240/57* (2013.01); *F05D 2240/59* (2013.01); *F05D 2260/38* (2013.01); *F16C 33/72* (2013.01); *F16J 15/545* (2013.01)

(58) Field of Classification Search
CPC .............. F04D 29/044; F04D 29/0405; F04D 29/0473; F04D 29/10; F01D 5/026; F01D 11/003; F01D 25/183; F01D 25/186
See application file for complete search history.

(56) References Cited

U.S. PATENT DOCUMENTS

| | | | | |
|---|---|---|---|---|
| 4,326,835 A | * | 4/1982 | Wertz | F01D 5/22 416/193 A |
| 5,501,573 A | * | 3/1996 | Sanders | F01D 5/225 277/303 |

(Continued)

FOREIGN PATENT DOCUMENTS

EP    2543827 A2    1/2013

OTHER PUBLICATIONS

Extended European Search Report for EP Application No. 18173654.7, dated Oct. 23, 2018, 7 pages.

*Primary Examiner* — Hai H Huynh
*Assistant Examiner* — Gonzalez Laguarda
(74) *Attorney, Agent, or Firm* — Kinney & Lange, P.A.

(57) ABSTRACT

An intershaft seal assembly that is between a first shaft and a second shaft of a bearing compartment of an engine includes a first seal element and a retaining element. The first seal element surrounds the first shaft and includes a first portion is in contact with the first shaft and a second portion extending in a non-parallel direction to a radial direction of the first shaft. The retaining element is threadably engaged with the first shaft such that the retaining element presses the first seal element against the shoulder of the first shaft.

20 Claims, 6 Drawing Sheets

(56) References Cited

U.S. PATENT DOCUMENTS

| | | | | |
|---|---|---|---|---|
| 6,132,168 A | * | 10/2000 | Kovaleski | F01D 11/001 |
| | | | | 415/107 |
| 6,196,790 B1 | | 3/2001 | Sheridan et al. | |
| 6,887,038 B2 | | 5/2005 | Cabe et al. | |
| 8,899,593 B2 | | 12/2014 | Jahn et al. | |
| 9,004,495 B2 | | 4/2015 | Vasagar | |
| 9,033,657 B2 | | 5/2015 | Gibson | |
| 2012/0243977 A1 | * | 9/2012 | Simonet | F01D 9/041 |
| | | | | 415/173.3 |
| 2012/0261887 A1 | * | 10/2012 | Vasagar | F01D 11/003 |
| | | | | 277/543 |
| 2017/0101879 A1 | | 4/2017 | Wotzak | |

* cited by examiner

DEFLECTION SPRING SEAL

BACKGROUND

The present disclosure relates to seal assemblies. More particularly, the present disclosure relates to intershaft seal assemblies in aircraft engines.

In aircraft engines, intershaft sealing is difficult for many reasons such as space limitations, unique deflections of the shafts, and counter-rotating surfaces of the shafts. Additionally, machining of sealing features into high cost parts is risky. During operation of the aircraft engine, contact points of an intershaft sealing assembly that are prone to rubbing can cause thermal mechanical fatigue issues. Additionally, maneuvers can make it difficult to maintain necessary gaps between the seal assembly and rotating shafts. Traditional labyrinth or knife edge seals are typically employed to maintain necessary transient thermals tolerances.

SUMMARY

An intershaft seal assembly that is between a first shaft and a second shaft of a bearing compartment of an engine includes a first seal element and a retaining element. The first seal element surrounds the first shaft and includes a first portion that is in contact with the first shaft and a second portion extending in a non-parallel direction to a radial direction of the first shaft. The retaining element is threadably engaged with the first shaft such that the retaining element presses the first seal element against the shoulder of the first shaft.

An engine includes a compressor section, a combustor in fluid communication with the compressor section, a turbine section in fluid communication with the combustor, and an intershaft seal assembly. The compressor section includes a first compressor supported for rotation on a first shaft with a shoulder and a second compressor supported for rotation on a second shaft. The turbine section includes a first turbine driving the first compressor through the first shaft and a second turbine driving the second compressor through the second shaft. The intershaft seal assembly is disposed between the first shaft and the second shaft and includes a first seal element surrounding the first shaft and a retaining element threadably engaged with the first shaft. The first seal element has a first portion in contact with the first shaft and a second portion that extends in a non-parallel direction to a radial direction of the first shaft. The second portion of the first seal element is configured to bend radially towards the first shaft upon the second shaft coming into contact with the first seal element. The retaining element presses the first seal element against the shoulder of the first shaft.

DETAILED DESCRIPTION

An intershaft seal assembly includes cup washers, or spring seals, that include an angle relative to a radial direction of the shafts enabling deflection of the washers under a severe or catastrophic shaft deflection event (e.g., blade out event). The angle of the washers allows the washers to bend radially inwards during shaft deflection, thereby preventing wearing of the seal and the shaft as well as preventing critical failure of the seal elements. Additionally, if aircraft maneuvers cause a radial gap between the washers and the shaft(s) to close on one side during a shaft deflection event, the washer can briefly contact the interfacing surface of the shaft and deflect radially inboard minimizing damage to the washer and the shaft.

Figure 1:
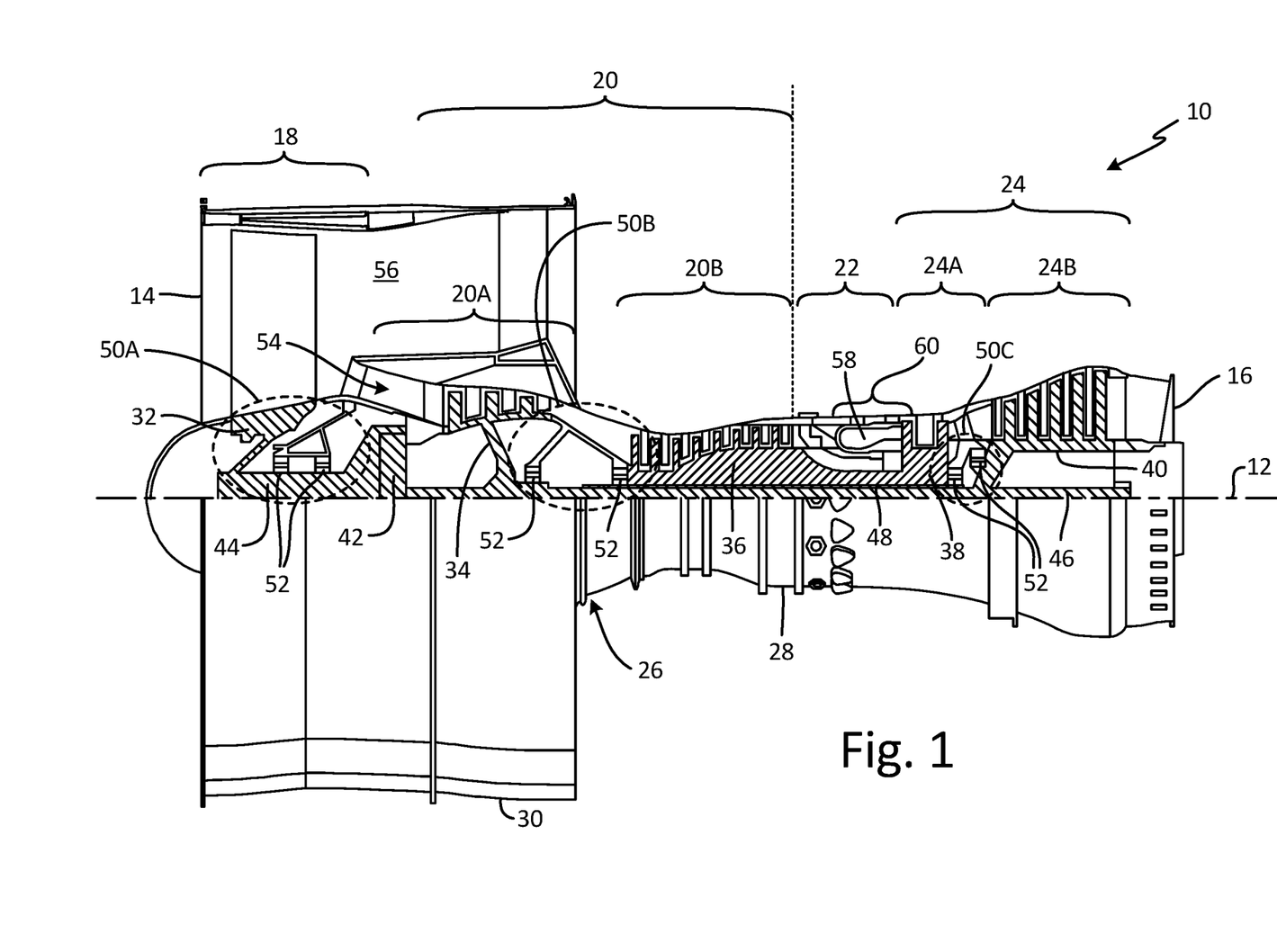
FIG. 1 is a side partial cross-section view of an engine.

FIG. 1 shows a side partial cross-section view of engine 10 and includes axial centerline 12, upstream airflow inlet 14, downstream airflow exhaust outlet 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with core case 28 and fan case 30), fan rotor 32, LPC rotor 34, HPC rotor 36, HPT rotor 38, LPT rotor 40, gear train 42, fan shaft 44, low speed shaft 46 (e.g., first shaft), high speed shaft 48 (e.g., second shaft), bearing compartments 50A, 50B, and 50C, plurality of bearings 52, core gas path 54, bypass gas path 56, combustion chamber 58, and combustor 60.

In one non-limiting embodiment, engine 10 can be a gas turbine engine. In other non-limiting embodiments, engine 10 can include a helicopter (e.g., HPW3000), a variable cycle advanced technology, an adaptive engine technology development, or other type of engine.

Engine 10 extends along axial centerline 12 between upstream airflow inlet 14 and downstream airflow exhaust outlet 16. Engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes core case 28 (e.g., a core case) and fan case 30 (e.g., a fan case). Core case 28 may house one or more of fan section 18, compressor 20, combustor section 22, and turbine section 24 (e.g., an engine core). Fan case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between core case 28 and fan case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40, respectively drive rotation of HPC rotor 36 and LPC rotor 34 and compression of the air received from core gas path 54. The rotation of LPT rotor 40 also drives (via gear train 42) the rotation of fan rotor 32, which propels bypass air through and out of bypass gas path 56. The propulsion of the bypass air may account for a majority of thrust generated by engine 10, which can be more than 75% of engine thrust. Engine 10 of the present disclosure, however, is not limited to the foregoing exemplary thrust ratio. Engine 10 of the present disclosure can be a high-bypass turbofan, either geared (as shown) or non-geared, or a low-bypass turbofan, or a turbojet, or a turboshaft, or a turboprop. Engine 10 of the present disclosure can be a two-spool engine (as shown) or a three-spool engine.

Figure 2:
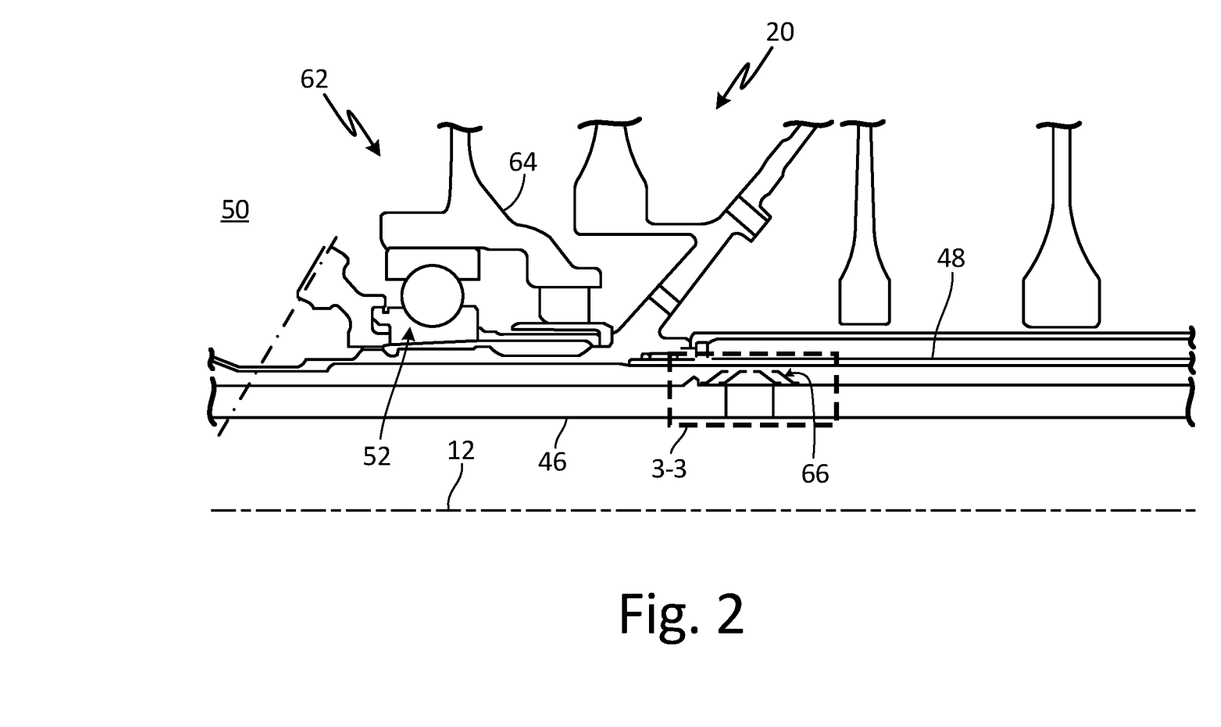
FIG. 2 is a cross-section view of a bearing compartment with a seal assembly of the engine.

FIG. 2 is a cross-section view of bearing compartment 50 of engine 10 and shows axial centerline 12, compressor section 20, low speed shaft 46, high speed shaft 48, bearing compartment 50, bearing 52, seal assembly 62, bearing compartment housing 64, and intershaft seal assembly 66. In one non-limiting embodiment, bearing compartment 50 is representative of bearing compartment 50B of engine 10. It is to be understood that the following discussion of bearing compartment 50 is applicable to any bearing compartment (e.g., 50A, 50B, or 50C) of engine 10 or another type of engine. Thus, in other non-limiting embodiments, it will be appreciated that the present disclosure can also apply to other portions of engine 10, as well as any other type of engine (e.g., aircraft or otherwise) which would be expected to be subject to combinations of thermal and mechanical stresses comparable to those seen particularly in engines used in craft with high degrees of maneuverability.

Seal assembly 62 is an assembly of seal components. In one non-limiting embodiment, seal assembly 62 includes an assembly of rotating seal elements. Bearing compartment housing 64 is a housing of bearing compartment 50. Bearing compartment housing 64 can be formed from any metal, such as steel, titanium, and/or nickel, which provides the necessary thermal and mechanical durability and elasticity required for mating and/or sealing applications of bearing compartment housing 64. Intershaft seal assembly 66 is an assembly of annular seal elements. In one non-limiting embodiment, intershaft seal assembly 66 can include cup washers, cup springs, spring seals, or other types of annular resilient seal elements.

Low speed shaft 46 and high speed shaft 48 are configured to rotate relative to engine 10. Seal assembly 62 is disposed within, connected to, and attached to bearing compartment housing 64. Bearing compartment housing 64 forms and surrounds a portion bearing compartment 50. Bearing compartment housing 64 is connected and/or mounted to engine housing 26 (shown in FIG. 1). Intershaft seal assembly 66 is disposed on low speed shaft 46 and extends between low speed shaft 46 and high speed shaft 48.

Low speed shaft 46 is configured to rotate separately from high speed shaft 48 during operation of engine 10. In one non-limiting embodiment, low speed shaft 46 can rotate at a same speed and/or in a same direction as high speed shaft 48 during some operating conditions of engine 10. In other non-limiting embodiments, low speed shaft 46 can rotate at a different speed and/or in a different direction as high speed shaft 48 during other operating conditions of engine 10. Bearing compartment 50 is sealed with seal assembly 62 so as to prevent passage of a fluid across seal assembly 62 and into bearing compartment 50. In one non-limiting embodiment, seal assembly 62 can prevent oil and/or air from leaking out of or into bearing compartment 50.

Intershaft seal assembly 66 forms a sealing interface between low speed shaft 46 and high speed shaft 48. During operation of engine 10, maneuvers of the aircraft cause low speed shaft 46 and high speed shaft 48 to deflect radially thereby reducing a gap between intershaft seal assembly 66 and high speed shaft 48. In existing designs with traditional vertically oriented labyrinth or knife-edge seals (e.g., extending solely in a radial direction from low speed shaft 46), deflection of the low speed shaft and/or the high speed shaft during maneuvers or critical failure events of engine 10 can cause damage or complete structural failure of the labyrinth or knife-edge seals and either of the two rotating shafts.

As will be discussed further with respect to FIG. 3A, intershaft seal assembly 66 functions to reduce the wear and damage to the interface between intershaft seal assembly 66 and high speed shaft 48. Intershaft seal assembly 66 is configured to allow radially inward deflection of seal elements of intershaft seal assembly 66 during events where high speed shaft 48 comes into contact with the seal elements of intershaft seal assembly 66. By way of their angle to axial centerline 12 and their shape, the seal elements of intershaft seal assembly 66 deflect and bend radially inward when engine 10 undergoes a maneuver while still maintaining the structural integrity of low speed shaft 46, high speed shaft 48, and the seal elements of intershaft seal assembly 66.

Figure 3A:
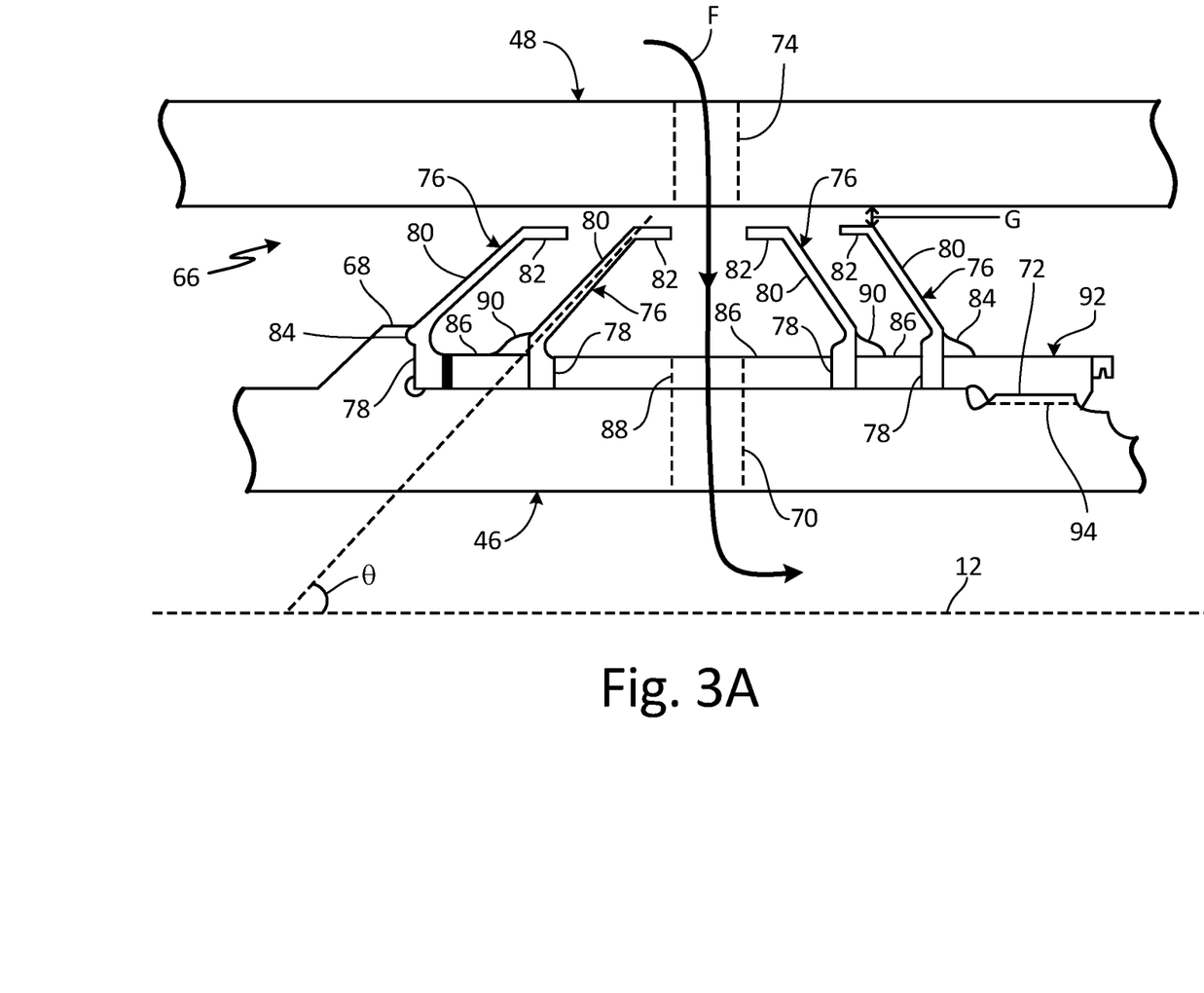
FIG. 3A is an enlarged cross-section view of the seal assembly in FIG. 2 taken along 3-3.

FIG. 3A is an enlarged cross-section view of intershaft seal assembly 66 from FIG. 2 taken along 3-3 and shows axial centerline 12, low speed shaft 46 (with shoulder 68, passage 70, and threaded portion 72), high speed shaft 48 (with passage 74), intershaft seal assembly 66 (with seal elements 76 including first portions 78, second portions 80, third portions 82, and anti-rotation features 84), spacers 86

(with passage 88 and anti-rotation features 90), retaining element 92 (with threaded portion 94), flowpath F, gap G, and angle θ.

Shoulder 68 is a projection of solid material. Passages 70, 74, and 88 are openings or channels configured for the passage of a fluid. Threaded portions 72 and 92 are helical ridges. Seal elements 76 are ring-shaped resilient elements of solid material. In one non-limiting embodiment, seal element can include a concave portion such that any of seal elements 76 can face in a concave upstream direction (to the left in FIG. 3A) or in a concave downstream direction (to the right in FIG. 3A). In one non-limiting embodiment, seal elements 76 can include cup washers, cup springs, spring seals, or other types of resilient seal elements and/or generally in the shape of a ring or annulus. In another non-limiting embodiment, a material of any one of seal elements 76 can include aluminum, copper, brass, steel, or other metal. First portions 78, second portions 80, and third portions 82 are ring-shaped portions of solid material. Third portions 82 are extensions. As shown in FIG. 3A, a shape of third portions 82 includes a flat cross-section shape (e.g., cylindrical shape around the annulus of seal element 76).

Anti-rotation feature 84 is a radial projection of solid material. Spacers 86 are hollow cylindrically shaped portions of solid material. Anti-rotation feature 90 is an axial projection of solid material. Retaining element 92 is a hollow cylindrically shaped portion of solid material with threaded portion 94 and anti-rotation feature 84. Flowpath F is a path of a flow of fluid. Gap G is a space extending radially between seal elements 76 and a radially inward surface of high speed shaft 48. Angle θ is an angle between second portions 80 and axial centerline 12.

Shoulder 68 is connected to and extends radially outward from low speed shaft 46. Passage 70 extends radially through a portion of low speed shaft 46 and is fluidly connected to passages 74 and 86. Threaded portion 72 is connected to and extends radially outward from low speed shaft 46. Passage 74 extends radially through a portion of high speed shaft 48 and is fluidly connected to passages 70 and 84. In this non-limiting embodiment, passage 70 and passage 74 can be in radial alignment such that passages 70 and 74 are aligned in a radial direction relative to either high speed shaft 48 and/or low speed shaft 46. In another non-limiting embodiment, passage 88 can be in radial alignment with one or both of passages 70 and 74 such that passages 70, 74, and 88 are aligned in a radial direction relative to either high speed shaft 48 and/or low speed shaft 46.

Seal elements 76 surround low speed shaft 46 and are located radially between low speed shaft 46 and high speed shaft 48. In one non limiting embodiment, seal elements 76 can include cup washers, cup springs, spring seals, or other types of resilient seal elements and/or generally in the shape of a ring or annulus. In another non-limiting embodiment, a material of any one of seal elements 76 can include aluminum, copper, brass, steel, or other metal and can take the form of sheet metal. In one non-limiting embodiment, at least two consecutive seal elements 76 can face concave towards each other such as shown in FIG. 3A.

First portions 78 are in contact with low speed shaft 46 and are connected to second portions 80. Second portions 80 are connected to first portions 78 and third portions 82. Second portions 80 extend in a non-parallel direction to a radial direction (shown as bottom to top in FIG. 3A) of low speed shaft 46. In one non-limiting embodiment, second portions 80 can extend at angle θ relative to axial centerline 12 wherein angle θ can be 0 to 90 degrees. In another non-limiting embodiment, second portions 80 can extend at angle θ relative to axial centerline 12 wherein angle θ can be 30 to 60 degrees. Third portions 82 are disposed on distal ends of second portions 80 from first portions 78.

Anti-rotation feature 84 is connected to and extends from one of seal elements 76. Spacers 86 are disposed on low speed shaft 46 and axially between axially consecutive seal elements 76. Passage 88 extends radially through a portion of spacer 84 and is fluidly connected to passages 70 and 74. Anti-rotation features 90 are connected to and extend from spacers 86. Retaining element 92 is threadably engaged with low speed shaft 46 via threaded portion 94 of retaining element and threaded portion 72 of low speed shaft 46. Threaded portion 94 of retaining element 92 is connected to and extends radially inward from retaining element 92. Threaded portion 94 is threadably engaged with threaded portion 72 of low speed shaft 46.

Flowpath F extends through passage 74 of high speed shaft 48, through passage 88 of spacer 84, through passage 70 of low speed shaft 46, and between two of seal elements 76. Gap G extends between the radially outward surfaces of third portions 82 of seal elements 76 and the radially inward surface of high speed shaft 48. In one non-limiting embodiment, gap G can include a distance of up to 0.030 inches (0.762 millimeters) under normal operating conditions (e.g., non-failure modes) of engine 10. Angle θ is representative of an angle between second portion 80 of seal element 76 and axial centerline 12 of engine 10.

Shoulder 68 of low speed shaft 46 functions to provides an axial stop against which seal elements 76 and spacers 86 are pressed against for axial and rotational retention. Passages 70, 74, and 88 function to provide airflow via flowpath F from compressor section 20 (shown in FIG. 1) to a downstream portion of turbine section 24. Threaded portion 72 of low speed shaft 46 functions to engage with threaded portion 94 of retaining element 92 so as to attach retaining element 92 to low speed shaft 46 as well as retain seal elements 76 and spacers 86 on low speed shaft 46.

Seal elements 76 function to provide a minimal clearance between third portions 82 of seal elements 76 and high speed shaft 48. Seal elements 76 provide a sealing interface with high speed shaft 48 in order to minimize passage of fluid axially across intershaft seal assembly 66. Seal elements 76 are configured to deflect or bend upon high speed shaft 48 coming into contact with seal elements 76. First portions 78 of sealing element 76 function to center seal elements 76 on low speed shaft 46. Second portions 80 are configured to bend radially inward towards low speed shaft 46 upon high speed shaft 48 coming into contact with seal elements 76. Third portions 82 function to provide a sealing interface between seal element 76 and high speed shaft 48.

In one non-limiting embodiment, anti-rotation features 84 can engage with one of seal elements 76 to prevent relative rotational motion between one of seal elements 76 and at least one of spacers 86, shoulder 68 of low speed shaft 46, and retaining element 92. Spacers 86 function to provide axial spacing between sealing elements 76. Spacers 86 also function to press, or compress, seal elements 76 in an axial direction against shoulder 68 of low speed shaft 46 so as to prevent relative rotation between seal element 76 and low speed shaft 46. In another non-limiting embodiment, anti-rotation features 90 can engage with one of seal elements 76 to prevent relative rotational motion between spacers 90 and at least one of seal elements 76.

Retaining element 92 presses seal element 76 and spacers 86 in a radially upstream direction (right to left in FIG. 3A) against shoulder 68 of low speed shaft 46 so as to retain seal element 76 and spacers 86 in a stationary axial and rotational position along low speed shaft 46. Threaded portion 94 of retaining element 92 functions to engage with threaded portion 72 of low speed shaft 46 so as to attach retaining element 92 to low speed shaft 46 as well as retain seal elements 76 and spacers 86 on low speed shaft 46.

Previous designs of intershaft seal assemblies include labyrinth seals or knife-edge seals extending solely in a radial direction between the low speed shaft and the high speed shaft. As a result, deflection of either the low speed shaft or the high speed shaft during a maneuver or critical failure event could result in damage to the high speed shaft, the labyrinth seal, and/or the knife-edge seal. Seal elements 76 of intershaft seal assembly 66 are flexible enough that small amounts of contact with high speed shaft 48 would not cause significant wear on high speed shaft 48. Intershaft seal assembly 66 with seal element 76 can also be used to mitigate damage from a catastrophic failure of engine 10, such as a blade out event, during which extreme bending loads go through low speed shaft 46 and high speed shaft 48. As opposed to traditional, radially extending labyrinth or knife-edge seals that can rub between shafts and possibly cut through into an outer shaft causing significant damage, seal elements 76 of intershaft seal assembly 66 are able to deflect and crumple without compromising the structural integrity of low speed shaft 46 or high speed shaft 48.

Figure 3B:
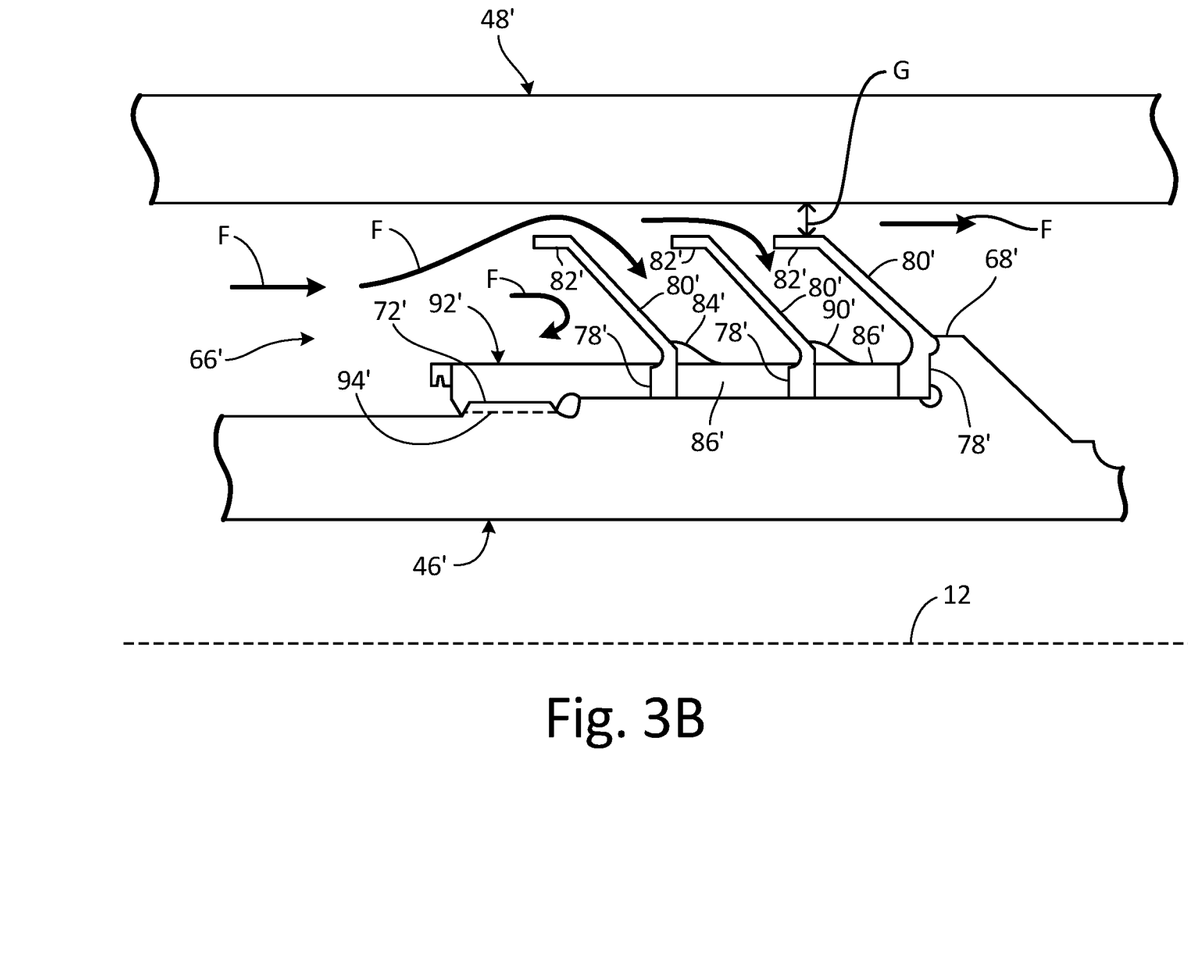
FIG. 3B is a cross-section view of a seal assembly.

FIG. 3B is a cross-section view of seal assembly 66' and shows axial centerline 12, low speed shaft 46' (with shoulder 68' and threaded portion 72'), high speed shaft 48', intershaft seal assembly 66' (with seal elements 76' including first portions 78', second portions 80', third portions 82', and anti-rotation features 84'), spacers 86' (with passage 88' and anti-rotation features 90'), retaining element 92' (with threaded portion 94'), flowpath F, and gap G. FIG. 3B includes similar elements to those shown in FIG. 3A, with the elements of FIG. 3B being arranged in a different configuration as to those shown in FIG. 3A.

Shoulder 68' is connected to and extends radially outward from low speed shaft 46'. Shoulder 68' is located downstream of seal elements 76'. Threaded portion 72' is connected to and extends radially outward from low speed shaft 46' at a location upstream of seal elements 76'. Seal elements 76' surround low speed shaft 46' and are located radially between low speed shaft 46' and high speed shaft 48'. In one non-limiting embodiment, seal elements 76' can face concave upstream (from right to left in FIG. 3B). First portions 78' are in contact with low speed shaft 46' and are connected to second portions 80'. Second portions 80' are connected to first portions 78' and third portions 82'. Second portions 80' extend in a non-parallel direction to a radial direction (shown as bottom to top in FIG. 3B) of low speed shaft 46'. Third portions 82' are disposed on distal ends of second portions 80' from first portions 78'.

Anti-rotation feature 84' is connected to and extends from one of seal elements 76'. Spacers 86' are disposed on low speed shaft 46' and axially between axially consecutive seal elements 76'. Anti-rotation feature 90' is connected to and extends from one of spacers 86'. Retaining element 92' is threadably engaged with low speed shaft 46' via threaded portion 94' of retaining element and threaded portion 72' of low speed shaft 46'. Threaded portion 94' of retaining element 92' is connected to and extends radially inward from retaining element 92'. Threaded portion 94' is threadably engaged with threaded portion 72' of low speed shaft 46'. Flowpath F flows between high speed shaft 48' and low speed shaft 46', and across seal elements 76'. Gap G extends between the radially outward surfaces of third portions 82' of seal elements 76' and the radially inward surface of high speed shaft 48'.

Shoulder 68' of low speed shaft 46' functions to provides an axial stop against which seal elements 76' and spacers 86' are pressed against for axial and rotational retention. Threaded portion 72' of low speed shaft 46' functions to engage with threaded portion 94' of retaining element 92' so as to attach retaining element 92' to low speed shaft 46' as well as retain seal elements 76' and spacers 86' on low speed shaft 46'.

The configuration of seal elements 76' as shown in FIG. 3B functions to provide a seal assembly in circumstances where a flow path extending through low speed shaft 46' and high speed shaft 48' is not incorporated (see e.g., FIG. 3A). Seal assembly 66' therefore provides an alternate path for flowpath F to pass across seal elements 76' that provide a cascading sealing effect as flowpath F passes downstream (from left to right in FIG. 3B) across consecutive seal elements 76'. As flowpath F gets drawn into the spaces between consecutive seal elements 76', flowpath F pushes radially outward upon second portions 80' of seal elements 76' thereby causing third portions 82' to be drawn towards high speed shaft 48'. Seal assembly 66' also provides a small axial cross-section than does seal assembly 66 shown in FIG. 3A allowing seal assembly 66' to be used in engines where a smaller axial cross section of seal assembly 66' is beneficial.

Figure 4A:
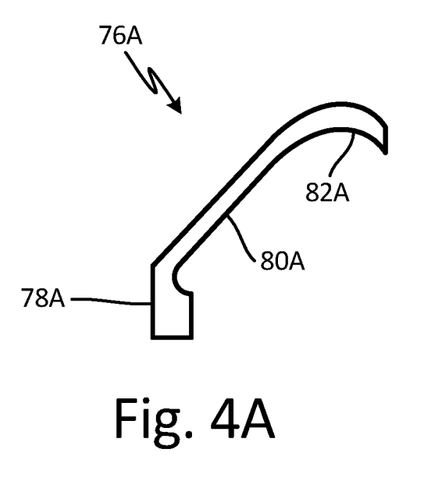
FIG. 4A is a cross-section view of a seal element with a curved cross-sectional shape.

FIG. 4A is a cross-section view of seal element 76A and shows first portion 78A, second portion 80A, and third portion 82A. Third portion 82A includes a curved cross-sectional shape. The curved cross-sectional shape of third portion 82A allows third portion 82A to remain in contact with high speed shaft 48 as second portion 80A rotates or bends radially inward towards low speed shaft 46 due to its curved outer surface. This is beneficial as third portion 82A does not include a pointed or sharp edge thereby reducing the risk of seal element 76A damaging high speed shaft 48 during instances of severe deflection by either low speed shaft 46 or high speed shaft 48.

Figure 4B:
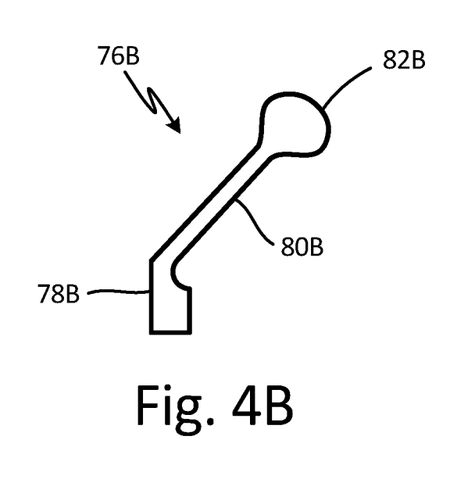
FIG. 4B is a cross-section view of a seal element with a bulbous cross-sectional shape.

FIG. 4B is a cross-section view of seal element 76B and shows first portion 78B, second portion 80B, and third portion 82B. Third portion 82B includes a bulbous cross-sectional shape. The bulbous cross-sectional shape of third portion 82B allows third portion 82B to remain in contact with high speed shaft 48 as second portion 80B rotates or bends radially inward towards low speed shaft 46 due to its bulbous outer surface. This is beneficial as third portion 82B does not include a pointed or sharp edge thereby reducing the risk of seal element 76B damaging high speed shaft 48 during instances of severe deflection by either low speed shaft 46 or high speed shaft 48.

Figure 4C:
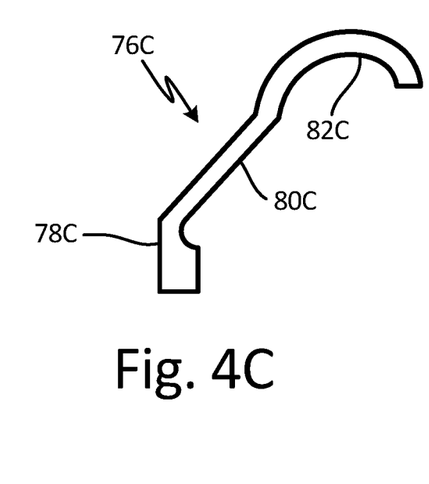
FIG. 4C is a cross-section view of a seal element with an arcuate cross-sectional shape.

FIG. 4C is a cross-section view of seal element 76C and shows first portion 78C, second portion 80C, and third portion 82C. Third portion 82C includes an arcuate cross-sectional shape. The arcuate cross-sectional shape of third portion 82C allows third portion 82C to remain in contact with high speed shaft 48 as second portion 80C rotates or bends radially inward towards low speed shaft 46 due to its arcuate outer surface. This is beneficial as third portion 82C does not include a pointed or sharp edge thereby reducing the risk of seal element 76C damaging high speed shaft 48 during instances of severe deflection by either low speed shaft 46 or high speed shaft 48.

Figure 4D:
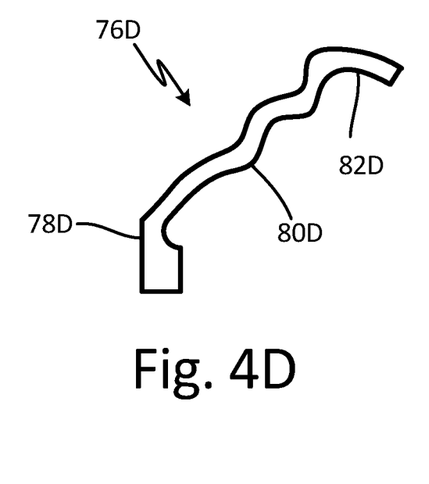
FIG. 4D is a cross-section view of a seal element with a serpentine cross-sectional shape.

FIG. 4D is a cross-section view of seal element 76D and shows first portion 78D, second portion 80D, and third portion 82D. Second portion 80D and third portion 82D includes a serpentine cross-sectional shape. The serpentine cross-sectional shape of third portion 82D allows third portion 82D to remain in contact with high speed shaft 48 as second portion 80D rotates or bends radially inward towards low speed shaft 46 due to its serpentine outer surface. This is beneficial as third portion 82D does not include a pointed or sharp edge thereby reducing the risk of seal element 76D damaging high speed shaft 48 during instances of severe deflection by either low speed shaft 46 or high speed shaft 48.

Figure 4E:
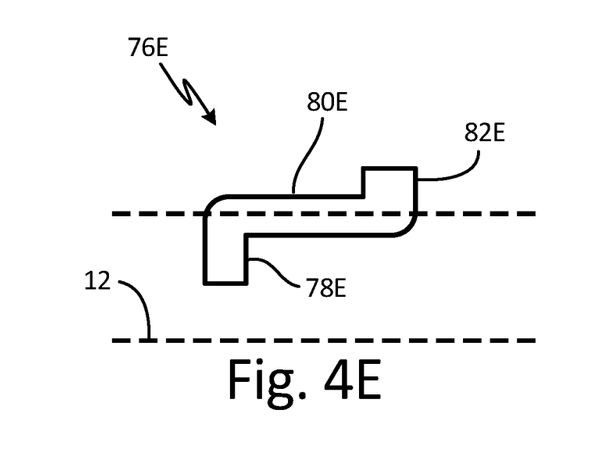
FIG. 4E is a cross-section view of a seal element with a portion parallel to a centerline axis of the engine.

FIG. 4E is a cross-section view of seal element 76E and shows axial centerline 12, first portion 78E, second portion 80E, and third portion 82E. Second portion 80E is parallel to axial centerline 12 of engine 10, which provides for a larger spring constant of seal element 76E and larger moment arm of seal element 76 than other embodiments thereby allowing third portion 82E to remain in contact with high speed shaft 48 as second portion 80E rotates or bends radially inward towards low speed shaft 46. This is beneficial as third portion 82E is more flexible than other embodiments allowing for a higher frequency or life cycle of seal element 76 and further reducing the risk of seal element 76E damaging high speed shaft 48 during instances of severe deflection by either low speed shaft 46 or high speed shaft 48.

Figure 4F:
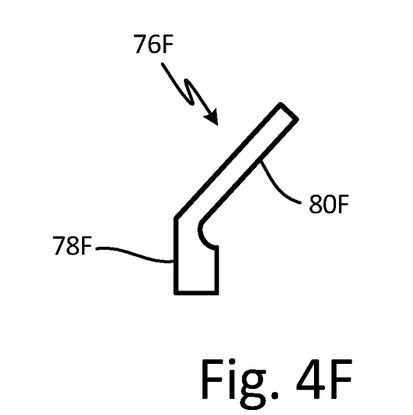
FIG. 4F is a cross-section view of a seal element with an angular cross-sectional shape.

FIG. 4F is a cross-section view of seal element 76F and shows first portion 78F and second portion 80F. Seal element 76F includes an angular cross-sectional shape. The angular cross-sectional shape of second portion 80F allows second portion 80F to come into contact with high speed shaft 48 over a smaller portion of surface area than other embodiments. In one non-limiting embodiment, second portion 80F bends radially inward under instances of deflection of sealing element 76F causing just a tip of a corner of second portion 80F to come into contact with high speed shaft 48. This minimal surface area at the point of contact between seal element 76F and high speed shaft 48 minimizes the amount of wear on high speed shaft thereby reducing the risk of seal element 76F damaging high speed shaft 48 during instances of severe deflection by either low speed shaft 46 or high speed shaft 48.

Figure 4G:
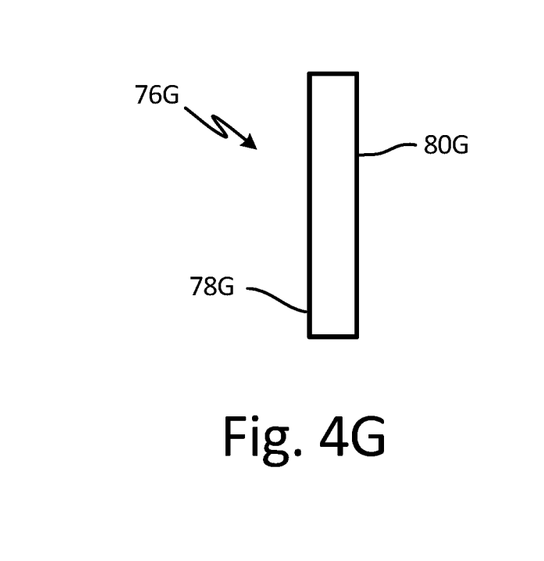
FIG. 4G is a cross-section view of a seal element with a planar cross-sectional shape.

FIG. 4G is a cross-section view of seal element 76G and shows first portion 78G and second portion 80G. Seal element 76G includes a planar cross-sectional shape, which removes manufacturing complexity from sealing element 76G thereby reducing the cost it takes to produce sealing element 76. Sealing element 76G is narrower than other embodiments and therefore can be used in seal assemblies with narrower axial spaces where narrower sealing elements are be beneficial.

Figure 4H:
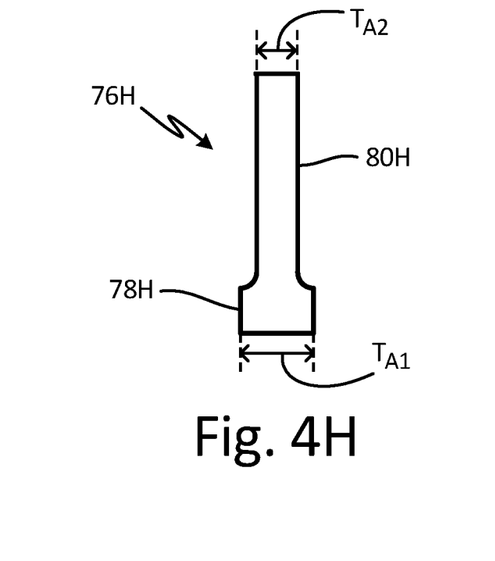
FIG. 4H is a cross-section view of a seal element with a first portion that is wider than a second portion.

FIG. 4H is a cross-section view of seal element 76H that shows first portion 78H (with first axial thickness $T_{A1}$) and second portion 80H (with second axial thickness $T_{A2}$). Seal element 76 H includes a planar cross sectional shape such that first axial thickness $T_{A1}$ of first portion 78H is greater than second axial thickness $T_{A2}$ of second portion 80H. The larger first axial thickness $T_{A1}$ of first portion 78H allows for seal assembly 66 to function without the need for spacers 86 to be separate components from seal element 76H. In other words, first portion 78H can also function as a spacer in seal assembly 66 due to the enlarged first axial thickness $T_{A1}$. This is beneficial by reducing part count thereby reducing tolerances between individual elements in seal assembly 66 and increasing the sealing capability and efficiency of seal assembly 66.

Discussion of Possible Embodiments

The following are non-exclusive descriptions of possible embodiments of the present invention.

An intershaft seal assembly that is between a first shaft and a second shaft of a bearing compartment of an engine includes a first seal element and a retaining element. The first seal element surrounds the first shaft and includes a first portion that is in contact with the first shaft and a second portion extending in a non-parallel direction to a radial direction of the first shaft. The retaining element is threadably engaged with the first shaft such that the retaining element presses the first seal element against the shoulder of the first shaft.

The assembly of the preceding paragraph can optionally include, additionally and/or alternatively, any one or more of the following features, configurations and/or additional components.

A spacer can be disposed axially between consecutive seal elements of the plurality of seal elements.

A first anti-rotation feature can extend from the spacer, wherein the first anti-rotation feature can be configured to engage with at least one of the plurality of seal elements to prevent relative rotational motion between the spacer and the at least one of the plurality of seal elements.

At least one of the plurality of seal elements can comprise a second anti-rotation feature extending from the at least one of the plurality of seal elements, wherein the second anti-rotation feature can be configured to engage with at least one of the spacer, the shoulder, and/or the retaining element to prevent relative rotational motion between the at least one of the plurality of seal elements and at least one of the spacer, the shoulder, and/or the retaining element.

A first passage can extend radially through a portion of the first shaft, wherein the second shaft can comprise a second passage extending radially through a portion of the second shaft, and wherein a flowpath can extend through the first passage, the second passage, and/or between two of the plurality of seal elements.

At least two consecutive seal elements of the plurality of seal elements can face concave towards each other.

A third portion can be disposed on a distal end of the second portion from the first portion, wherein the third portion can comprise an extension.

A cross-sectional shape of the extension can comprise a flat, curved, arcuate, serpentine, or bulbous shape.

The first seal element can be configured to deflect upon the second shaft coming into contact with the first seal element.

The second portion of the first seal element can be configured to bend radially towards the first shaft upon the second shaft coming into contact with the first seal element.

The second portion of the first seal element can extend at an angle from an axial centerline of the first shaft, wherein the angle can be 0 to 90 degrees.

The second portion of the first seal element can extend at an angle from an axial centerline of the first shaft, wherein the angle can be 30 to 60 degrees.

An engine includes a compressor section, a combustor in fluid communication with the compressor section, a turbine section in fluid communication with the combustor, and an intershaft seal assembly. The compressor section includes a first compressor supported for rotation on a first shaft with a shoulder and a second compressor supported for rotation on a second shaft. The turbine section includes a first turbine driving the first compressor through the first shaft and a second turbine driving the second compressor through the second shaft. The intershaft seal assembly is disposed between the first shaft and the second shaft and includes a first seal element surrounding the first shaft and a retaining element threadably engaged with the first shaft. The first seal element has a first portion in contact with the first shaft and a second portion that extends in a non-parallel direction to a radial direction of the first shaft. The second portion of the first seal element is configured to bend radially towards the first shaft upon the second shaft coming into contact with the first seal element. The retaining element presses the first seal element against the shoulder of the first shaft.

The engine of the preceding paragraph can optionally include, additionally and/or alternatively, any one or more of the following features, configurations and/or additional components.

A spacer can be disposed axially between consecutive seal elements of the plurality of seal elements.

A first anti-rotation feature can extend from the spacer, wherein the first anti-rotation feature can be configured to engage with at least one of the plurality of seal elements to prevent relative rotational motion between the spacer and the at least one of the plurality of seal elements.

A second anti-rotation feature can extend from the at least one of the plurality of seal elements, wherein the second anti-rotation feature can be configured to engage with at least one of the spacer, the shoulder, and the retaining element to prevent relative rotational motion between the spacer and the at least one of the plurality of seal elements.

A first passage can extend radially through a portion of the first shaft, wherein the second shaft can comprise a second passage extending radially through a portion of the second shaft, and wherein a flowpath can extend through the first passage, the second passage, and/or between two of the plurality of seal elements.

At least two consecutive seal elements of the plurality of seal elements can face concave towards each other.

A third portion can be disposed on a distal end of the second portion from the first portion, wherein the third portion can comprise an extension.

A cross-sectional shape of the extension can comprise a flat, curved, arcuate, serpentine, or bulbous shape.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An intershaft seal assembly between a first shaft and a second shaft of a bearing compartment of an engine, the seal assembly comprising:
   a first seal element surrounding the first shaft, the first seal element with a first portion and a second portion, wherein the first portion is in contact with the first shaft and is connected to the second portion, wherein the second portion extends in a non-radial direction of the first shaft;
   a plurality of seal elements, wherein the first shaft comprises a first passage extending radially through a portion of the first shaft, wherein the second shaft comprises a second passage extending radially through a portion of the second shaft, and wherein a flowpath extends through the first passage, the second passage, and between two of the plurality of seal elements; and
   a retaining element threadably engaged with the first shaft, wherein the retaining element presses the first seal element against a shoulder of the first shaft.

2. The intershaft seal assembly of claim 1, wherein the first passage and the second passage radially aligned such that the first passage and the second passage are aligned in a radial direction of the first shaft.

3. The intershaft seal assembly of claim 1, wherein at least two consecutive seal elements of the plurality of seal elements face concave towards each other.

4. The intershaft seal assembly of claim 1 further comprising a spacer disposed axially between each of consecutive seal elements of the plurality of seal elements, wherein the spacer is a hollow cylinder of solid material, wherein the spacer comprises a first anti-rotation feature extending from the spacer, wherein the first anti-rotation feature is configured to engage with at least one of the plurality of seal elements to prevent relative rotational motion between the spacer and the at least one of the plurality of seal elements.

5. The intershaft seal assembly of claim 4, wherein at least one of the plurality of seal elements comprises a second anti-rotation feature extending from the at least one of the plurality of seal elements, wherein the second anti-rotation feature is configured to engage with at least one of the spacer, the shoulder, and the retaining element to prevent relative rotational motion between the at least one of the plurality of seal elements and at least one of the spacer, the shoulder, and the retaining element.

6. The intershaft seal assembly of claim 4, wherein the spacer includes a third passage extending therethrough, wherein the third passage is in radial alignment with the first passage and the second passage such that the first passage, the second passage, and the third passage are aligned in a radial direction of the first shaft.

7. The intershaft seal assembly of claim 1, wherein the first seal element comprises a third portion disposed on a distal end of the second portion from the first portion, wherein the third portion comprises an extension.

8. The intershaft seal assembly of claim 7, wherein a cross-sectional shape of the extension comprises a curved, arcuate, serpentine, or bulbous shape.

9. The intershaft seal assembly of claim 1, wherein the first seal element is configured to deflect upon the second shaft coming into contact with the first seal element.

10. The intershaft seal assembly of claim 9, wherein the second portion of the first seal element is configured to bend radially towards the first shaft upon the second shaft coming into contact with the first seal element.

11. The intershaft seal assembly of claim 1, wherein the second portion of the first seal element extends at an angle from an axial centerline of the first shaft, wherein the angle is between 0 to 90 degrees.

12. The intershaft seal assembly of claim 1, wherein the second portion of the first seal element extends at an angle from an axial centerline of the first shaft, wherein the angle is 30 to 60 degrees.

13. An engine comprising;
   a compressor section including a first compressor supported for rotation on a first shaft and a second compressor supported for rotation on a second shaft, wherein the first shaft comprises a shoulder;
   a combustor in fluid communication with the compressor section;
   a turbine section in fluid communication with the combustor including a first turbine driving the first compressor through the first shaft and a second turbine driving the second compressor through the second shaft;

an intershaft seal assembly disposed between the first shaft and the second shaft, the intershaft seal comprising:
- a first seal element surrounding the first shaft, the first seal element with a first portion and a second portion, wherein the first portion is in contact with the first shaft and is connected to the second portion, wherein the second portion extends in a non-radial of the first shaft, wherein the second portion of the first seal element is configured to bend radially towards the first shaft upon the second shaft coming into contact with the first seal element;
- a plurality of seal elements;
- a spacer disposed axially between each of consecutive seal elements of the plurality of seal elements, wherein the spacer is a hollow cylinder of solid material; and
- a retaining element threadably engaged with the first shaft, wherein the retaining element presses the first seal element against the shoulder of the first shaft.

14. The engine of claim 13, wherein the spacer comprises a first anti-rotation feature extending from the spacer, wherein the first anti-rotation feature is configured to engage with at least one of the plurality of seal elements to prevent relative rotational motion between the spacer and the at least one of the plurality of seal elements.

15. The engine of claim 13, wherein at least one of the plurality of seal elements comprises a second anti-rotation feature extending from the at least one of the plurality of seal elements, wherein the second anti-rotation feature is configured to engage with at least one of the spacer, the shoulder, and the retaining element to prevent relative rotational motion between the spacer and the at least one of the plurality of seal elements.

16. The engine of claim 13, wherein the first shaft comprises a first passage extending radially through a portion of the first shaft, wherein the second shaft comprises a second passage extending radially through a portion of the second shaft, and wherein a flowpath extends through the first passage, the second passage, and between two of the plurality of seal elements, further wherein the first and second passages are radially aligned such that the first passage and the second passage are aligned in a radial direction of the first shaft.

17. The engine of claim 16, wherein the spacer includes a third passage extending therethrough, wherein the third passage is in radial alignment with the first passage and the second passage such that the first passage, the second passage, and the third passage are aligned in a radial direction of the first shaft.

18. The engine of claim 13, wherein at least two consecutive seal elements of the plurality of seal elements face concave towards each other.

19. The engine of claim 13, wherein the first seal element comprises a third portion disposed on a distal end of the second portion from the first portion, wherein the third portion comprises an extension.

20. The engine of claim 19, wherein a cross-sectional shape of the extension comprises a curved, arcuate, serpentine, or bulbous shape.

* * * * *